US010052976B2

(12) United States Patent
Atger et al.

(10) Patent No.: US 10,052,976 B2
(45) Date of Patent: Aug. 21, 2018

(54) MULTIPLE-POSITION SEAT FOR DRIVING OPERATOR

(71) Applicant: STELIA AEROSPACE, Rochefort (FR)

(72) Inventors: Bastien Atger, Rochefort (FR); Laurent Cecinas, Breuil Magne (FR)

(73) Assignee: STELIA AEROSPACE, Rochefort (FR)

( * ) Notice: Subject to any disclaimer, the term of this patent is extended or adjusted under 35 U.S.C. 154(b) by 121 days.

(21) Appl. No.: 14/856,532

(22) Filed: Sep. 16, 2015

(65) Prior Publication Data

US 2016/0075260 A1    Mar. 17, 2016

(30) Foreign Application Priority Data

Sep. 17, 2014 (FR) ..................................... 14 58784

(51) Int. Cl.
| | |
|---|---|
| *B60N 2/22* | (2006.01) |
| *B64D 11/06* | (2006.01) |
| *B60N 2/68* | (2006.01) |
| *B60N 2/62* | (2006.01) |

(52) U.S. Cl.
CPC ............... *B60N 2/22* (2013.01); *B60N 2/62* (2013.01); *B60N 2/686* (2013.01); *B64D 11/064* (2014.12)

(58) Field of Classification Search
CPC . B60N 2/22; B60N 2/686; B60N 2/62; B64D 11/064
USPC .............................. 297/284.1, 354.12, 284.11
See application file for complete search history.

(56) References Cited

U.S. PATENT DOCUMENTS

| | | | | |
|---|---|---|---|---|
| 4,641,884 | A | | 2/1987 | Miyashita et al. |
| 5,120,109 | A | * | 6/1992 | Rangoni .............. B60N 2/1803 297/284.3 |
| 7,152,927 | B1 | * | 12/2006 | Halstrom ............... A47C 1/036 297/408 |
| 7,195,316 | B2 | * | 3/2007 | Shimasaki ............. A47C 7/024 297/284.11 |
| 2007/0102985 | A1 | * | 5/2007 | Taniguchi ............ B60N 2/0284 297/423.36 |

FOREIGN PATENT DOCUMENTS

| | | |
|---|---|---|
| DE | 197 05 477 A1 | 8/1998 |
| EP | 0 195 930 A2 | 10/1986 |
| WO | 95/34234 A1 | 12/1995 |
| WO | 2012/053022 A1 | 4/2012 |

* cited by examiner

*Primary Examiner* — Milton Nelson, Jr.
(74) *Attorney, Agent, or Firm* — Im IP Law; C. Andrew Im

(57) ABSTRACT

A driving seat comprises a base and a back rest forming a support structure. The back rest is articulated onto the base about an axis of inclination of the back rest to provide an adjustable back rest inclination angle. The base comprises a rear base panel of fixed inclination and a front base panel with an adjustable base inclination angle relative to the rear base panel. The back rest comprises a lower back rest panel and an upper back rest panel with an adjustable raising angle relative to the lower back rest panel. In operation, the back rest inclination angle, the base inclination angle and the raising angle are adjustable to adapt the configuration of the seat to a working configuration, a standby configuration, a rest configuration or a crash configuration.

17 Claims, 4 Drawing Sheets

MULTIPLE-POSITION SEAT FOR DRIVING OPERATOR

RELATED APPLICATIONS

This application claims priority from French Patent Application No. 14 58784 filed Sep. 17, 2014, which is herein incorporated by reference in its entirety.

TECHNICAL FIELD OF THE INVENTION

The invention relates to the field of seats for driving machines, for example for driving vehicles. It relates more particularly to a seat used by an operator, said seat comprising a rest position suitable for allowing the operator to keep monitoring the machine during a rest period. Such a seat is, for example, suitable for driving a vehicle, such as an airplane, when the driving of the vehicle is handled by two operators.

BACKGROUND OF THE INVENTION

In complex machines that have to operate over too long a period for the driving to be handled by a single operator, use is generally made of automatic driving devices and/or driving stations with two or more operators that can take over from one another to handle the driving of the machine.

When an operator is relieved of the driving, he or she benefits from a rest period but, in many cases, the operator remains at his or her driving station and simply places his or her seat in a position ensuring him or her of a position of optimal muscular and skeletal relaxation. In most cases, the back rest of the seat can be inclined to a greater or lesser degree backwards to obtain the rest position.

This situation is typical in the piloting of civilian airplanes in which two pilots handle the driving of the airplane either simultaneously in a co-ordinated manner in the critical flight phases (take-off and landing in particular) or, alternatively, in the flight phases in which the workload is reduced (cruising for example).

However, when the pilot in the rest phase uses a relatively inclined position of his or her seat to stretch out, he or she no longer has, in the natural position that he or she has adopted, the information displayed on the control instruments and he or she leaves the piloting loop. In case of emergency, additional time is then needed for him or her to take in the information and understand the situation in which he or she has to intervene.

Because of this, it is commonplace for pilots, in the rest period, not to place their seats in an optimal position for resting and to prefer, to the detriment of their physical recovery through a real rest period, to remain in a working position in order to remain informed of the flight parameters and be able to more effectively resume a flight or machine driving activity.

OBJECT AND SUMMARY OF THE INVENTION

The object of the present invention is to remedy these drawbacks by benefitting from a driving seat structure, for example for driving a vehicle or, generally, a machine requiring actions and monitoring, comprising only a small number of mobile structural parts while providing improved comfort, particularly in periods of rest of an operator, for example an aircraft pilot using the seat.

According to the invention, a driving seat comprises a seat pan and a back rest forming a support structure and a bearing surface for an occupant of the seat and determining a seat reference point SRP situated in a vertical axial plane of the seat at a junction of bearing surfaces of the seat pan and of the back rest.

According to a known seat architecture comprising adjustments, the back rest is fixed articulated on the seat pan about an axis of inclination of the back rest, oriented in a direction of an axis Y at right angles to a vertical plane of axial symmetry of the seat as a whole, situated in a bottom part of the back rest and in a rear part of the seat pan so as to allow a back rest inclination angle of the back rest relative to a vertical direction Z that is adjustable.

In the seat of the invention:
the seat pan is segmented and comprises a rear base panel, of constant fixed inclination relative to a supporting structure of the seat, and comprises a front base panel, situated in the extension and in front of the rear base panel, a base inclination angle (Alpha-A) of the front base panel relative to the rear base panel being modifiable when the seat is used;
the back rest is also segmented and comprises a lower back rest panel, held on the side of a bottom edge of said lower back rest panel with a rear edge of the rear base panel so as to form the back rest inclination angle (Beta) relative to the vertical direction Z that is modifiable, and comprises an upper back rest panel situated in the extension of and above the lower back rest panel, a raising angle (Alpha-D) of the upper back rest panel relative to the lower back rest panel being modifiable when the seat is used.

A seat is thus obtained whose support structure for the occupant of the seat is able to assume forms, according to a profile of the support structure, with curvatures that can be modified according to the needs of the occupant by adjustments of the angles between the panels of the seat pan and of the back rest by which the seat is segmented.

In one embodiment, the seat comprises at least one working position in which an occupant is in a seated position with the back rest straightened and the seat pan substantially horizontal and comprises at least one standby position in which the back rest is inclined backwards and partially straightened in an upper part corresponding to the upper back rest panel and the seat pan is raised in a front part corresponding to the front base panel.

There is thus obtained, by the adjustment of the angles between the different seat pan and back rest panels by which the seat is segmented, a seat that can assume a conventional working position and that can assume a muscular-skeletal relaxation position without depriving the occupant of the seat of the possibility of monitoring the screens of the machine, for example an aircraft, the driving of which is temporarily being handled by another operator or by an automatic function.

In a particular embodiment, the at least one working position is characterized by:
a back rest inclination angle (Beta) that is weakly positive backwards, less than 20 degrees, corresponding to a straightened back rest in a substantially vertical position;
a small raising angle (Alpha-D) of the upper back rest panel, less than 10 degrees as an absolute value, corresponding to a relatively flat back rest;
a small base inclination angle (Alpha-A), less than 3 degrees as an absolute value, corresponding to a relatively flat seat pan;
and the at least one standby position is characterized by:

a positive back rest inclination angle (Beta), backwards, equal to or greater than 30 degrees and less than or equal to 60 degrees;

a positive raising angle (Alpha-D), upwards, equal to or greater than 20 degrees and less than or equal to 35 degrees;

a positive base inclination angle (Alpha-A), upwards, equal to or greater than 5 degrees and less than or equal to 15 degrees.

Such values of the angles between the seat pan and back rest panels ensure postures suited to the working conditions and to the standby conditions requiring the attention of the occupant of the seat to be maintained.

Advantageously, when the environment of the seat permits, the seat comprises, in addition to working and standby positions, at least one rest position in which the back rest inclination angle (Beta) is greater than 60 degrees.

Advantageously, when the seat and its occupant are likely to be subject to significant accelerations, the seat comprises, in addition to the working and standby positions, and, where appropriate, rest position, at least one crash position in which the back rest is straightened and in which the base inclination angle (Alpha-A) is equal to or greater than 5 degrees, preferably greater than 8 degrees.

Such rest and crash positions are obtained by suitable adjustments of the angles between the seat pan and back rest panels without significantly affecting the complexity of the seat.

In one embodiment, a length Lpar of the rear base panel, in a longitudinal direction X of the seat between the reference point SRP and a front edge of said rear base panel, is determined with a minimum value for an ischial tuberosity of an occupant of the seat to bear on said rear base panel, at least for an envisaged population of occupants of the seat.

For example, for an aircraft pilot population, advantageously the length Lpar is substantially equal to 150 mm.

An optimal comfort of the occupant of the seat is thus assured by ensuring a stable position on the seat pan.

In one embodiment, a length LPinf of the lower back rest panel, between the reference point SRP and a top edge of said lower back rest panel, is determined to correspond substantially to the level of the tenth vertebra of an occupant of the seat, at least for an envisaged population of occupants of the seat.

For example, for an aircraft pilot population, the length LPinf is substantially equal to 400 mm.

A comfort of the occupant of the seat and a minimum of muscular-skeletal fatigue are thus assured, particularly in the standby position, by raising the shoulders of the occupant by an action on a flexible part of the spinal column.

In one embodiment, the seat comprises a head rest secured to the upper back rest panel, that can be adjusted by height and/or inclination relative to the upper back rest panel, and/or comprises a leg rest secured to the front base panel, in front of a front edge of the front base panel, and adjustable in inclination.

The head rest and the leg rest extend, at least in certain positions, the support structure and adjust the profile of the form of this support structure to optimize the support and the comfort of the occupant of the seat according to the adjustments of the other base and back rest panels.

In one embodiment, actuators are arranged to modify the back rest inclination angle (Beta), the raising angle (Alpha-D) of the upper back rest panel and the base inclination angle (Alpha-A) of the front base panel.

The actuators modify the angles between the panels without requiring any particular physical effort on the part of the occupant of the seat.

Advantageously, a device for controlling the actuators modifies the position of the seat between at least two positions, including at least one working position and at least one standby position, in response to a command from an occupant of the seat.

Thus, through a simple command from the occupant of the seat, it is possible to modify the relative positions of the different base and back rest panels, and where appropriate of the head rest and of the leg rest, to place his or her seat in a particular position: working, standby, rest, crash.

Although predetermined positions of the panels of the seat may have been defined for each of the positions of the seat, in one embodiment, the seat comprises controls accessible to an occupant of the seat to individually modify the back rest inclination angle (Beta), the raising angle (Alpha-D) of the upper back rest panel and the base inclination angle (Alpha-A), where appropriate the angle of the head rest and/or the angle of the leg rest.

In one embodiment, the upper back rest panel, and, where appropriate, the head rest, when the seat comprises a head rest and the inclination of this head rest is adjustable and likely to be unsuitable in the raised position of the back rest, are linked mechanically to the lower back rest panel and/or to the seat pan, for example by connecting rod links or other mechanical transmission means, such that the angles Alpha-D, and where appropriate Alpha-T, automatically assume certain values and/or are limited to ranges of values imposed as a function of the value of the back rest inclination angle Beta and/or to a longitudinal position of the seat pan.

Interference is thus avoided between rear parts of the seat and of the structure in the environment of the seat, or uncomfortable configurations of the support structure, without requiring any particular attention on the part of the occupant of the seat and allowing faster configuration changing actions, including in the mechanical adjustment case.

In one embodiment, the rear base panel, the only panel which is not adjustable in inclination, is translationally mobile, relative to an environment of said seat, in a longitudinal direction X, and/or in a transverse direction Y, and/or in a vertical direction Z, the directions X, Y and Z determining a seat reference frame, via the supporting structure.

It is thus possible to ensure a translational mobility of the support structure as a whole to take into account the desired adjustments, particularly as a function of the size of the occupant of the seat, to allow him or her a suitable positioning in the driving station.

BRIEF DESCRIPTION OF THE DRAWINGS

The invention is described in detail with reference to the drawings which schematically represent.

DETAILED DESCRIPTION OF THE EMBODIMENTS

The figures represent, in a simplified and schematic manner, an embodiment of the invention.

In the figures, the different parts of the seat are not necessarily represented to the same scale and parts or elements that are similar but represented in different forms bear the same reference.

Figure 1:
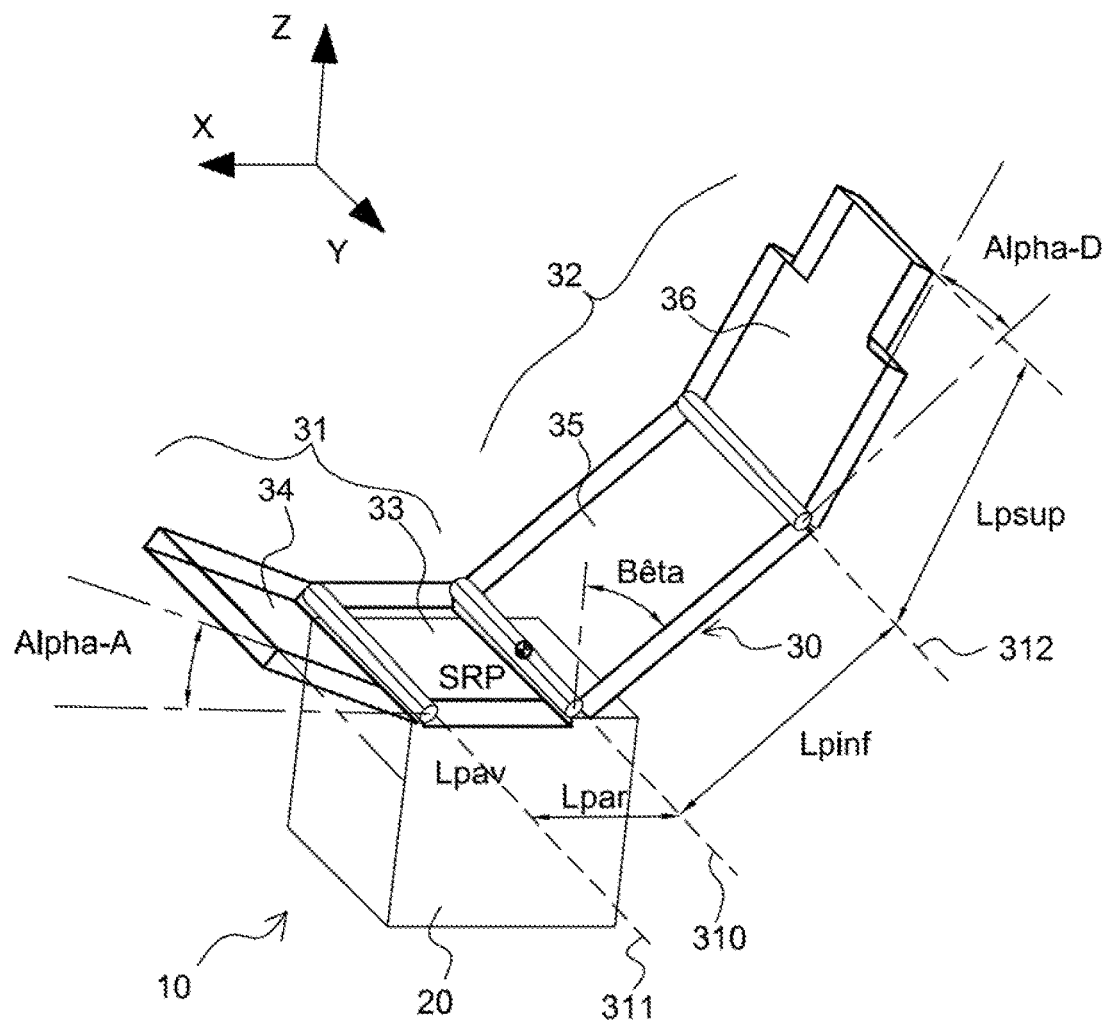
FIG. 1: a simplified perspective view of a seat according to the invention in a standby configuration with a bearing zone for the head incorporated in the back rest.

A seat 10, such as the seat illustrated symbolically in FIG. 1, comprises a supporting structure 20 on which is fixed a support structure 30 to support the different parts of an occupant of the seat: head, chest, pelvis, legs, etc.

The support structure 30 comprises substructures mutually juxtaposed such that upper surfaces of said substructures form bearing surfaces of a seat pan 31 and of a back rest 32 of the seat.

For the requirements of the present description, reference will be made where necessary to a seat reference frame X, Y, Z for the respectively longitudinal, transversal and vertical axes of the seat. According to the longitudinal axis X, the terms "front", "rear", "anterior" and "posterior", and according to the vertical axis Z, the terms "top", "bottom", "above" and "below" will be used, unless detailed or evidenced otherwise, according to the common direction which would be given them by an occupant of the seat. The transverse axis Y is at right angles to the plane XZ, to the left for an occupant of the seat, the axis Z being chosen to be positive upwards.

Conventionally, a seat reference point SRP is also defined, situated in a vertical axial plane of the seat at a junction of the bearing surfaces of the seat pan 31 and of the back rest 32.

The seat pan 31 comprises at least two subassemblies: a rear base panel 33 and a front base panel 34.

The front base panel 34 is joined to the rear base panel 33 in such a way as to be able to assume different angular positions, at least two distinct angular positions determined in the figures by an angle Alpha-A between a mean plane of the front base panel and a mean plane of the rear base panel, considered to be positive when the front base panel is raised relative to the rear base panel.

The front base panel 34 is for example joined via a hinge-type mounting about a base rotation axis 311. Locking means, not represented in the figures, are arranged to immobilize the angular position of said front base panel relative to the rear base panel 33 with a value selected by the occupant of the seat.

The rear base panel 33 is fixed to the supporting structure 20 with a constant longitudinal inclination. In the example illustrated, said inclination is zero, that is to say that the front base panel 34 is substantially parallel to the plane XY, but a moderate constant longitudinal inclination, positive or negative, may be considered in the context of optimization of comfort according to the type of workstation for which the seat 10 is intended.

A length Lpar of the rear base panel 33, the distance in the direction X between the SRP and the base rotation axis 311, is such that the ischial tuberosity of an occupant of the seat bears on said rear base panel, at least for an envisaged population of occupants of the seat.

For example, a length Lpar of 150 mm makes it possible to meet this criterion for 5% of a female population to 95% of a male population.

The anthropometric information can be established by measurements for a considered population and generally is available in specialist documents such as, for example: Tilley, A.R., & Henry Dreyfuss Associates (2002): "The measure of man and woman: Human Factors in Design", (revised edition) New York: John Wiley & Sons.

The length Lpar can however be adapted, by addition or by subtraction, to take into account a need to cover a specific population, but said length Lpar will be chosen to be as small as possible to avoid excessively limiting the front base panel 34.

A length Lpav of the front base panel 34 determines, by extending the rear base panel 33, a total base length substantially equal to Lpar+Lpay.

The length Lpav is therefore determined as a function of the value retained for the length Lpar in order to obtain an overall length that conforms to the use for which the seat is intended, an overall base length which therefore corresponds to that of a conventional seat.

The back rest 32 comprises at least two subassemblies: a lower back rest panel 35 and an upper back rest panel 36.

The back rest can also comprise, as in the example illustrated, a head rest 37.

The lower back rest panel 35 is, in a lower part of said lower back rest panel, joined to the rear base panel 33, in a rear part of said rear base panel, so as to form, between said lower back rest panel and said rear base panel, a modifiable back rest inclination angle Beta.

The angle Beta, as represented in the figures, is taken to be an inclination of the lower back rest panel 32 relative to a vertical, the direction of the axis Z of the seat reference frame, and considered as positive backwards.

In the example illustrated in FIG. 1, the lower back rest panel 35 is for example joined via a hinge-type mounting about a back rest inclination axis 310. Locking means, not represented in the figures, are arranged to immobilize the angular position of said lower back rest panel relative to the rear base panel 33 with a value selected by the occupant of the seat.

As is known, the back rest can be inclined more or less between a raised position, relatively vertical, and at least one position inclined backwards relative to the raised position.

The upper back rest panel 36 is joined to the lower back rest panel 36 in such a way as to be able to assume different angular positions, at least two distinct angular positions determined in the figures by an angle Alpha-D between a mean plane of the upper back rest panel and a mean plane of the lower back rest panel, considered positive when the upper back rest panel is raised relative to the mean plane of the lower back rest panel.

The upper back rest panel 36 is for example joined via a hinge-type mounting about a back rest rotation axis 312. Locking means, not represented in the figures, are arranged to immobilize the angular position of said front upper back rest panel relative to the lower back rest panel 35 with a value selected by the occupant of the seat.

A length Lpinf of the lower back rest panel 35, the distance between the reference points SRP and the back rest rotation axis 312, is such that said back rest rotation axis corresponds substantially to a position of the tenth vertebra of an occupant of the seat, for an envisaged population of occupants of the seat.

Tests carried out with a population of airplane pilots, for different values of Lpinf between 370 mm and 460 mm, have demonstrated that a value of Lpinf lying between 390 mm and 410 mm gives satisfaction for 90% of the sample having carried out the tests, the other 10% of the sample preferring a higher value of Lpinf without however exceeding a value of 450 mm.

The length Lpinf is advantageously set at approximately 400 mm in the case of an application to airplane pilot seats, a value that can be adapted, by addition or subtraction, to take into account a need to cover a specific population.

A length Lpsup of the upper back rest panel 36 determines, by extending the lower back rest panel 35, an overall back rest length substantially equal to Lpinf+Lpsup.

The length Lpsup is therefore determined as a function of the value retained for the length Lpinf in order to obtain an overall length of the back rest 32 in accordance with the usage for which the seat is intended.

The upper back rest panel 36 in this case has a length at least sufficient to allow a user of the seat to rest the shoulders thereon, and preferably the head if the seat does not include an independent head rest as in the form illustrated in FIG. 1.

Figure 2:
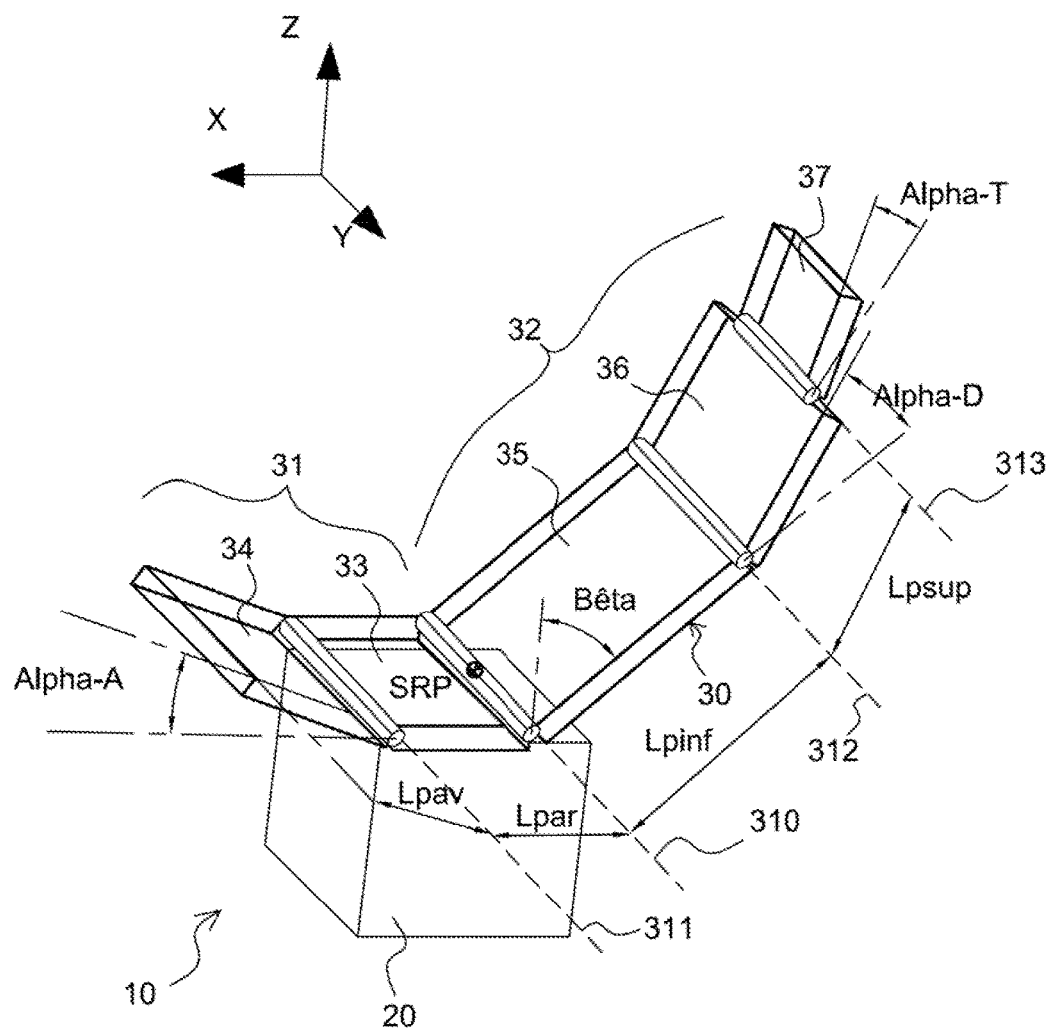
FIG. 2: a simplified perspective view of a seat according to the invention in a standby configuration with an independent head rest fixed to the back rest.

In one embodiment, as in the example illustrated in FIG. 2, the seat 10 comprises an adjustable head rest 37 joined to the upper back rest panel 36 at the level of a top edge of said upper back rest panel 36.

Advantageously, the head rest 37 is articulated relative to the upper back rest panel 36 about a head rest rotation axis 313 oriented along the axis Y, such that an angle Alpha-T between a bearing surface of said head rest and the upper back rest panel can be modified by the user of the seat between at least two values.

By convention, the angle Alpha-T is considered positive when the head rest 37 is inclined upwards or forwards relative to the upper back rest panel 36.

In one embodiment, a position of the head rest 37 according to the length of the back rest 32 can also be modified to more or less extend the upper back rest panel 36 and therefore the effective length of the back rest.

According to the exemplary configurations which have just been described, the support structure 30 of the seat 10, a support structure determining a seat surface on which an occupant of the seat bears, consists mainly of a set of mutually articulated panels, at least two base panels and two back rest panels.

The angles formed between the panels at the level of the articulations determine a modulable form of the support structure and therefore of the seat surface.

Depending on the activity of the occupant of the seat, the choice of suitable values for each of the angles Alpha-A, Alpha-D and Beta, and, where appropriate, of the angle Alpha-T, makes it possible to optimize the curvatures of the surface of the seat as detailed hereinbelow.

Figure 3:
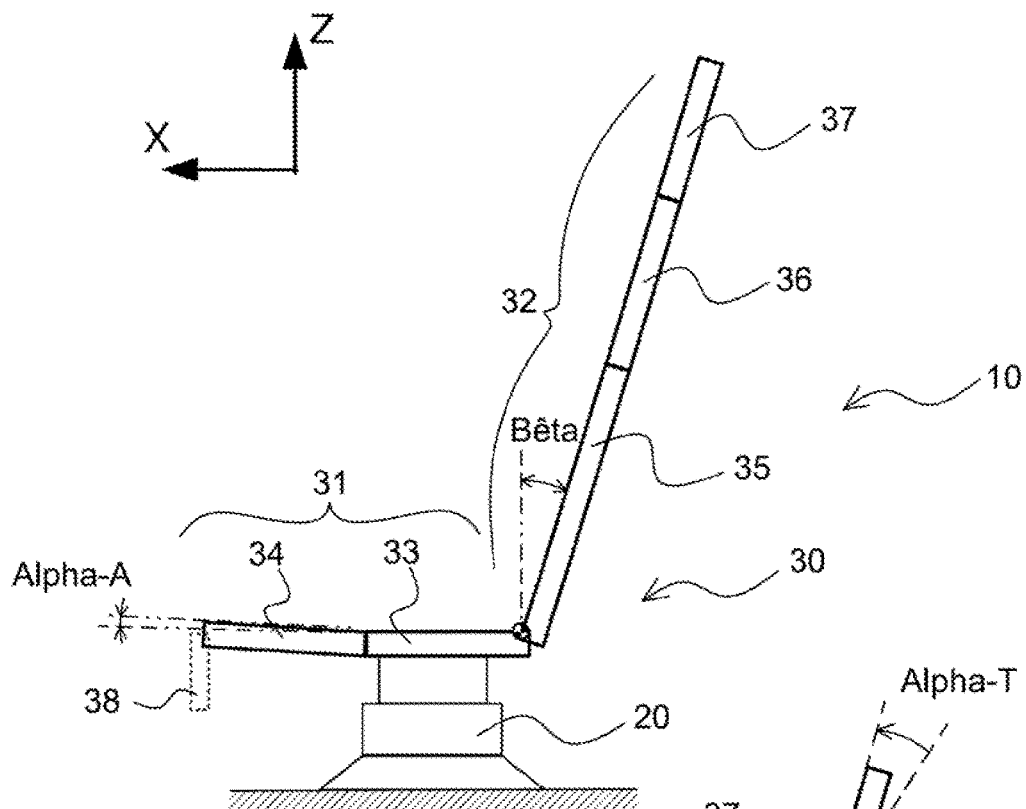
FIG. 3: the form of the profile of the bearing surface of a seat in the working configuration with the different articulated panels of the seat in their relative positions corresponding to this position.

In a first position, illustrated in FIG. 3, the seat is adapted by the form of the surface of the seat to a working position.

In this first position, the angle Alpha-A between the front base panel 34 and the rear base panel 33 is relatively small, close to a zero or slightly positive value, so as to form a substantially flat resulting base surface.

In this first position, the angle Alpha-D between the upper back rest panel 36 and the lower back rest panel 35 is also relatively small, close to a zero or slightly positive value, so as to form a substantially flat resulting back rest surface.

The back rest is, in this position, in the raised position, that is to say with an angle Beta that is weakly positive, generally of the order of 10 degrees, depending on the position of comfort desired by the occupant of the seat in the working position.

The result, for the angles between the panels of the seat, is thus a conventional form of the bearing surface of the seat.

Figure 6:
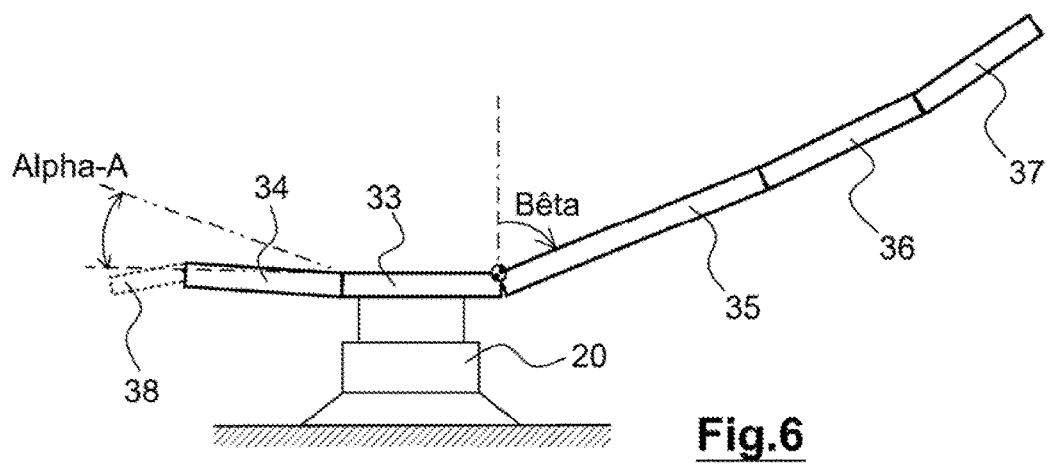
FIG. 6: the form of the profile of the bearing surface of a seat in the rest configuration with the different articulated panels of the seat in their relative positions corresponding to this position.

In a second position, illustrated in FIG. 6, the seat is adapted by the form of the surface of the seat to a rest position.

In this second position, as in the first position, the angle Alpha-A between the front base panel 34 and the rear base panel 33 is relatively small, close to a zero or slightly positive value, so as to form a substantially flat resulting base surface, and the angle Alpha-D between the upper back rest panel 36 and the lower back rest panel 35 is relatively small, close to a zero or slightly positive value, so as to form a substantially flat resulting back rest surface.

In this second position, unlike the first position, the back rest is inclined backwards by an angle Beta that is sufficiently great to give the bearing surface of the seat a relatively flat and horizontal overall form, providing the occupant of the seat with a muscular-skeletal relaxation position.

In practice, a maximum value lying between 60 degrees and 90 degrees will be sought for the angle Beta, but this value may be limited by the presence of obstacles situated behind the seat, for example a bulkhead of the cockpit when the seat is installed in an airplane.

Figure 4:
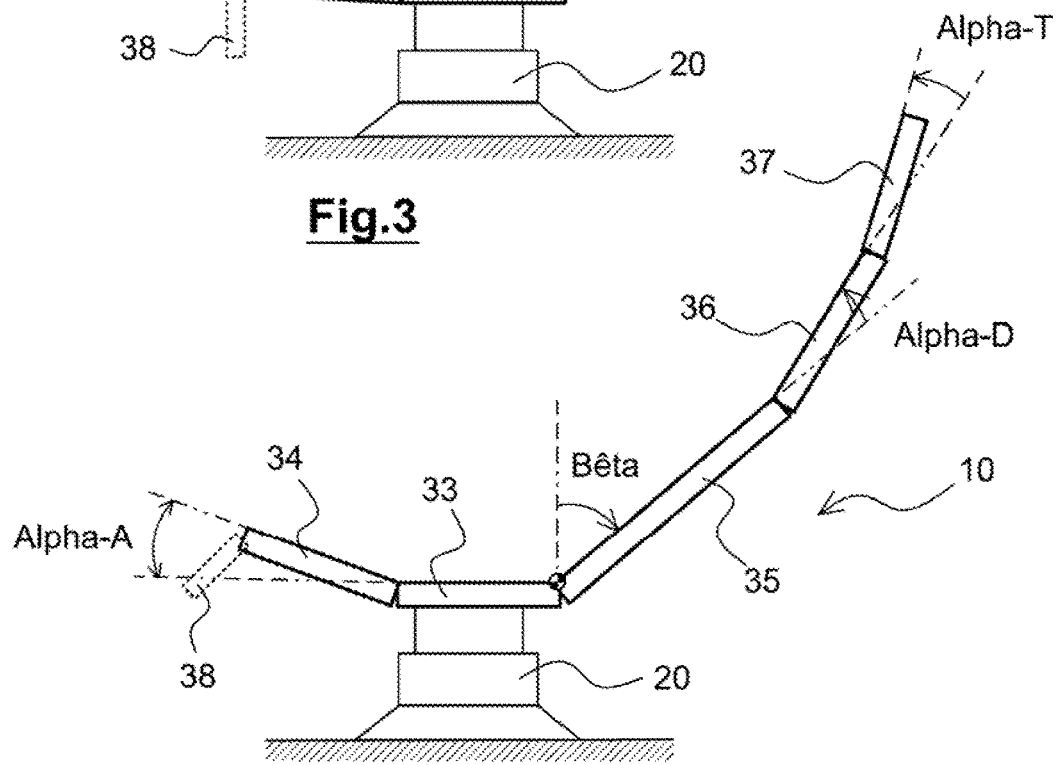
FIG. 4: the form of the profile of the bearing surface of a seat in the standby configuration with the different articulated panels of the seat in their relative positions corresponding to this position.

In a third position, illustrated in FIG. 4, the seat is adapted by the form of the surface of the seat to a standby position, corresponding to a period of rest with vigilance maintained.

This third position is characterized on the one hand by an inclination of the back rest 32 backwards by an angle Beta that is sufficiently great but without exceeding approximately 60 degrees to provide an occupant of the seat with a muscular-skeletal relaxation position and, on the other hand, by an angle Alpha-D between the upper back rest panel 36 and the lower back rest panel 35 that is positive so as to raise the shoulders and the head of an occupant of the seat for the instruments and screens situated in front of the seat, instruments normally used when piloting in a working phase, to be located in the visual field of said occupant of the seat without requiring any particular head movement and notably without requiring the head to be raised.

In another embodiment, in this third position, the angle Beta of inclination of the back rest is approximately 60 degrees and the angle Alpha-D by which the upper back rest panel 36 is raised is approximately 30 degrees.

In practice, anything more than the value of 30 degrees for the angle Alpha-D will be avoided for ergonomic reasons, an excessively high value for this angle being able to create a discomfort in the occupant of the seat and fatigue running counter to the effect sought.

Thus, the head of the occupant of the seat is only inclined backwards by approximately 30 degrees (Beta−Alpha-D) which makes it possible to watch the instruments simply by eye movements.

When the seat is equipped with a head rest 37 as in the form illustrated in FIG. 4, the occupant of the seat has available the capability to adjust the angular position of said head rest, if it is provided with this capability, to improve his or her standby position.

Advantageously in this third position, the angle Alpha-A between the front base panel 34 and the rear base panel 33 is set at a positive value, so as to raise the front base panel 34 and form a resulting dish-shaped base surface which prevents the occupant of the seat, in the standby position, from sliding forwards under the effect in particular of his or her own weight.

The angle Alpha-A preferably lies between 5 and 15 degrees, for example 8 degrees, which makes it possible to avoid sliding in good conditions of comfort.

In one embodiment of the seat 10, a leg rest 38 is arranged to be mobile on the seat in front of the front base panel 34. The leg rest 38 is deployed to extend, with an ergonomically adapted angle, the front base panel in the second position and in the third position.

In the first position, in working configuration, the leg rest 38 is advantageously retracted, for example into or under the support structure 30, so as not to hamper the movements of the occupant of the seat.

Figure 5:
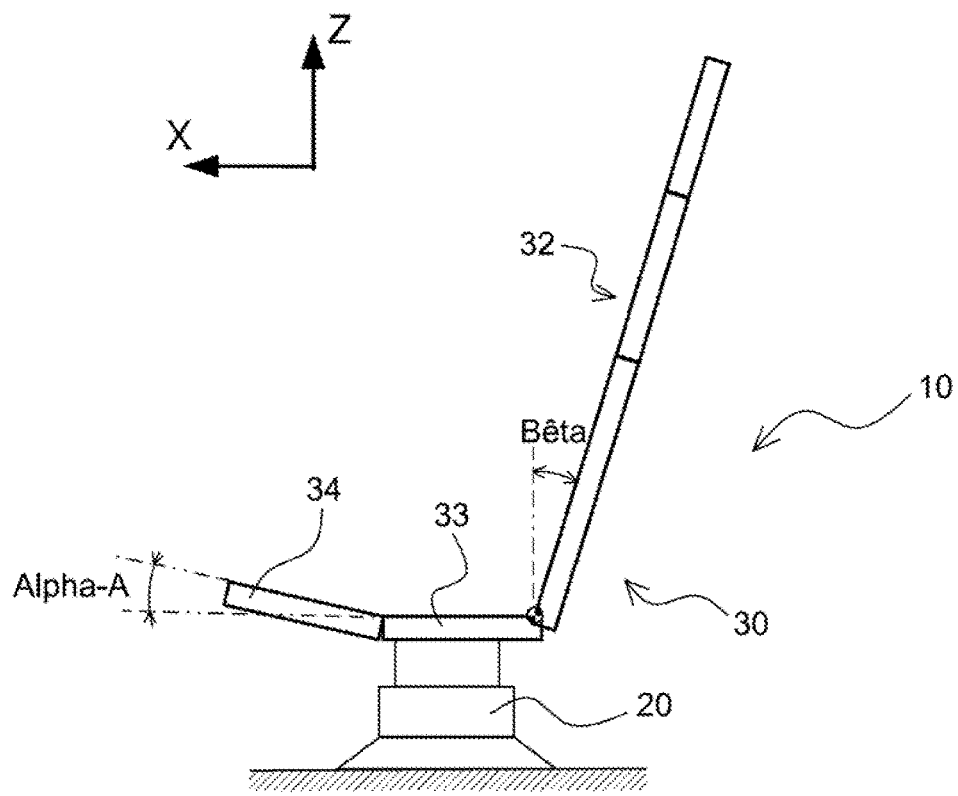
FIG. 5: the form of the profile of the bearing surface of a seat in the crash configuration with the different articulated panels of the seat in their relative positions corresponding to this position.

In a fourth position, illustrated in FIG. 5, the capabilities for adjustment of the angles between the base panels are exploited to place the seat in a crash configuration, improved for accident conditions.

In this fourth position, the back rest panels 32 are in positions similar to those of the first configuration of the working position, i.e. similar values for the angles Beta, Alpha-D and, where appropriate, Alpha-T, and the front base panel 34 is raised with an angle Alpha-A greater than 5 degrees.

This last position of the front base panel ensures that the occupant of the seat is held forwards when subjected to the accelerations of a crash and thus limits the risk of submarining.

The relative movements between the different panels of the support structure 30 about the rotation axes 310, 311, 312 and 313 are produced by any mechanism suitable for modifying the angle between two mutually articulated panels and for immobilizing the two panels at a desired angle according to the position of the seat.

For example, one or more actuators are implemented, in a conventional manner, to ensure the movements and the locking of the panels of the support structure.

The actuators, for example electrical or pneumatic, are controlled by the occupant of the seat individually or, preferably, through a control logic which co-ordinates the various actuators to switch the seat from one position to another.

In this last solution, advantageously, controls are left available to the occupant of the seat to enable him or her to individually modify certain angles and adapt the position of the different panels to his or her wishes.

In one embodiment, the control logic manages certain movements of the panels of the seat, in particular the upper back rest panel 36, to avoid interference with the environment of the seat.

According to one embodiment, the upper back rest panel 36, and, where appropriate, the head rest 37, are linked mechanically to the lower back rest panel 35 and/or to the seat pan 31, for example by connecting rod links or other mechanical transmission means, such that the angles Alpha-D, and where appropriate Alpha-T, automatically assume certain values and/or are limited to ranges of values imposed as a function of the value of the back rest inclination angle Beta and/or to a longitudinal position of the seat pan 31.

For example, when the lower back rest panel 35 is inclined backwards, the upper back rest panel 36, and if appropriate the head rest 37, are raised for example to avoid any interference of rear parts of the seat with a structure of the environment of said seat.

For example, when the seat is in the standby configuration, with the return of the lower back rest panel 35 to a straightened position, notably the case of the working position, the angles Alpha-D, and where appropriate Alpha-T, are modified to control an automatic alignment of the upper back rest panel 36, and where appropriate the head rest 37, with said lower back rest panel. The possibility of the occupant of the seat being pushed forwards at the shoulder and/or head level when he or she straightens the back rest 32 as a whole is thus avoided.

Depending on the embodiment, the movements of the different panels may be linked such that certain movements automatically result in other desired movements, or the movements of the different panels are limited, for example by means of variable abutments. These various forms may be combined as required.

According to one embodiment, the support structure 30, fixed to the supporting structure 20 by the rear base panel 33 whose inclination is constant in the seat reference frame, can be displaced vertically or in a horizontal plane to adjust a height or a longitudinal position of the seat.

Such displacements are assured by the supporting structure 20 which is for example extendable heightwise and makes it possible to produce translations of the rear base panel 33 in a horizontal plane.

The invention thus makes it possible to produce seats with bearing surfaces for the occupant of the seat of adjustable form making it possible for said occupant to adopt a standby position in which he or she is in a muscular-skeletal relaxation position while retaining, without any effort to hold the head, visibility of the instruments and screens of his or her workstation while the driving of the machine is performed by another operator.

This visibility of the instruments reduces the stress of the occupant of the seat who, in the conventional relaxation positions, tends to frequently rise from the backrest to check the instruments, particularly on each event, however minor it may be, simply to confirm that no intervention on his or her part is necessary.

The seat of the invention can be installed in any environment where an operator is responsible for monitoring a machine and for controlling operations over relatively long periods.

Such a situation applies in particular in the cockpits of aircraft, more particularly medium- and long-haul, whose flight durations lead to alternating periods of rest for the pilots.

The seat of the invention also makes it possible to have a seat in a position of relaxation in a confined space as is often the case in the cockpits of aircraft because of a bulkhead or other obstacle behind the seats of the pilots.

The invention claimed is:

1. Driving seat comprising:
a seat pan, on which an occupant of the driving seat can be seated, comprising a rear base panel of a constant fixed inclination relative to a supporting structure of the seat and substantially horizontal, a front base panel situated in an extension and in front of the rear base panel, and an adjustable base inclination angle of the front base panel relative to the rear base panel to modify a longitudinal curvature of the seat pan;
a back rest forming a support structure and a bearing surface for an occupant of the driving seat, a seat reference point situated in a vertical axial plane of the driving seat, at a junction of bearing surfaces of the seat pan and the back rest, in which the back rest is fixed and articulated onto the seat pan about an axis of inclination of the back rest, oriented in a direction of an axis at right angles to a vertical axial plane of symmetry of the seat, situated in a bottom part of the back rest and in a rear part of the seat pan to allow a back rest inclination angle of the back rest relative to a vertical direction to be adjustable; and the back rest comprising a lower back rest panel, a side of a bottom edge of the lower back rest panel forming the adjustable back rest inclination angle with a rear edge of the rear base panel, an upper back rest panel situated in an extension of and above the lower back rest panel, and an adjustable raising angle of the upper back rest panel relative to the lower back rest panel.

2. Driving seat according to claim 1, wherein a length of the rear base panel, in a longitudinal direction of the seat between the seat reference point and a front edge of the rear base panel, is substantially equal to 150 mm.

3. Driving seat according to claim 1, wherein a length of the lower back rest panel, between the seat reference point and a top edge of the lower back rest panel, is substantially equal to 400 mm.

4. Driving seat according to claim 1, further comprising a head rest secured to the upper back rest panel and adjustable at least in one of height and inclination relative to the upper back rest panel.

5. Driving seat according to claim 1, further comprising a leg rest secured to the front base panel, in front of a front edge of the front base panel, and adjustable in inclination.

6. Driving seat according to claim 1, further comprising controls accessible to the occupant of the driving seat to individually modify the back rest inclination angle, the raising angle of the upper back rest panel and the base inclination angle.

7. Driving seat according to claim 1, wherein the rear base panel is translationally mobile relative to an environment of the driving seat, in at least one of a longitudinal direction, a transverse direction, and a vertical direction; wherein a seat reference frame is determined by the longitudinal, transverse and vertical directions via the supporting structure of the seat.

8. Driving seat according to claim 1, wherein at least one of the upper back rest panel and a head rest are linked mechanically to at least one of the lower back rest panel and the seat pan; and wherein the raising angle and an angle between a bearing surface of the head rest and the upper back rest panel are at least one of the following: automatically assume predetermined values and limited to ranges of values imposed as a function of at least one of the back rest inclination angle and a longitudinal position of the seat pan.

9. Driving seat according to claim 8, further comprising connecting rod links to mechanically link said at least one of the upper back rest panel and a head rest to said at least one of the lower back rest panel and the seat pan.

10. Driving seat according to claim 1, further comprising at least one working position in which an occupant is in a seated position with the back rest straightened and the seat pan substantially horizontal; and at least one standby position in which the back rest is inclined backwards and partially straightened in an upper part corresponding to the upper back rest panel, and the seat pan is raised in a front part corresponding to the front base panel.

11. Driving seat according to claim 10, wherein the back rest inclination angle is less than 20 degrees, corresponding to a straightened back rest in a substantially vertical position, in said at least one working position; wherein the raising angle of the upper back rest panel is less than 10 degrees as an absolute value, corresponding to a relatively flat back rest, in said at least one working position; and wherein the base inclination angle is less than 3 degrees as an absolute value, corresponding to a relatively flat seat pan, in said at least one working position.

12. Driving seat according to claim 10, wherein the back rest inclination angle is equal to or greater than 30 degrees and less than or equal to 60 degrees in said at least one standby position; wherein the raising angle is equal to or greater than 20 degrees and less than or equal to 35 degrees in said at least one standby position; and wherein the base inclination angle is equal to or greater than 5 degrees and less than or equal to 15 degrees in said at least one standby position.

13. Driving seat according to claim 10, further comprising a rest position in which the back rest inclination angle is greater than 60 degrees.

14. Driving seat according claim 10, further comprising a crash position in which the back rest is straightened and in which the base inclination angle is equal to or greater than 5 degrees.

15. Driving seat according claim 14, wherein the base inclination angle is greater than 8 degrees.

16. Driving seat according to claim 10, further comprising actuators configured to modify the back rest inclination angle, the raising angle of the upper back rest panel and the base inclination angle of the front base panel.

17. Driving seat according to claim 16, further comprising a device to control the actuators modifying a position of the driving seat between at least two positions in response to a command from the occupant of the driving seat; said at least two positions includes said at least one working position and said at least one standby position.

* * * * *